Aug. 23, 1932.  R. L. BROWN ET AL  1,873,536
PROCESS FOR PRODUCING REACTION PRODUCTS FROM HYDROCARBONS AND WATER
Filed June 11, 1927
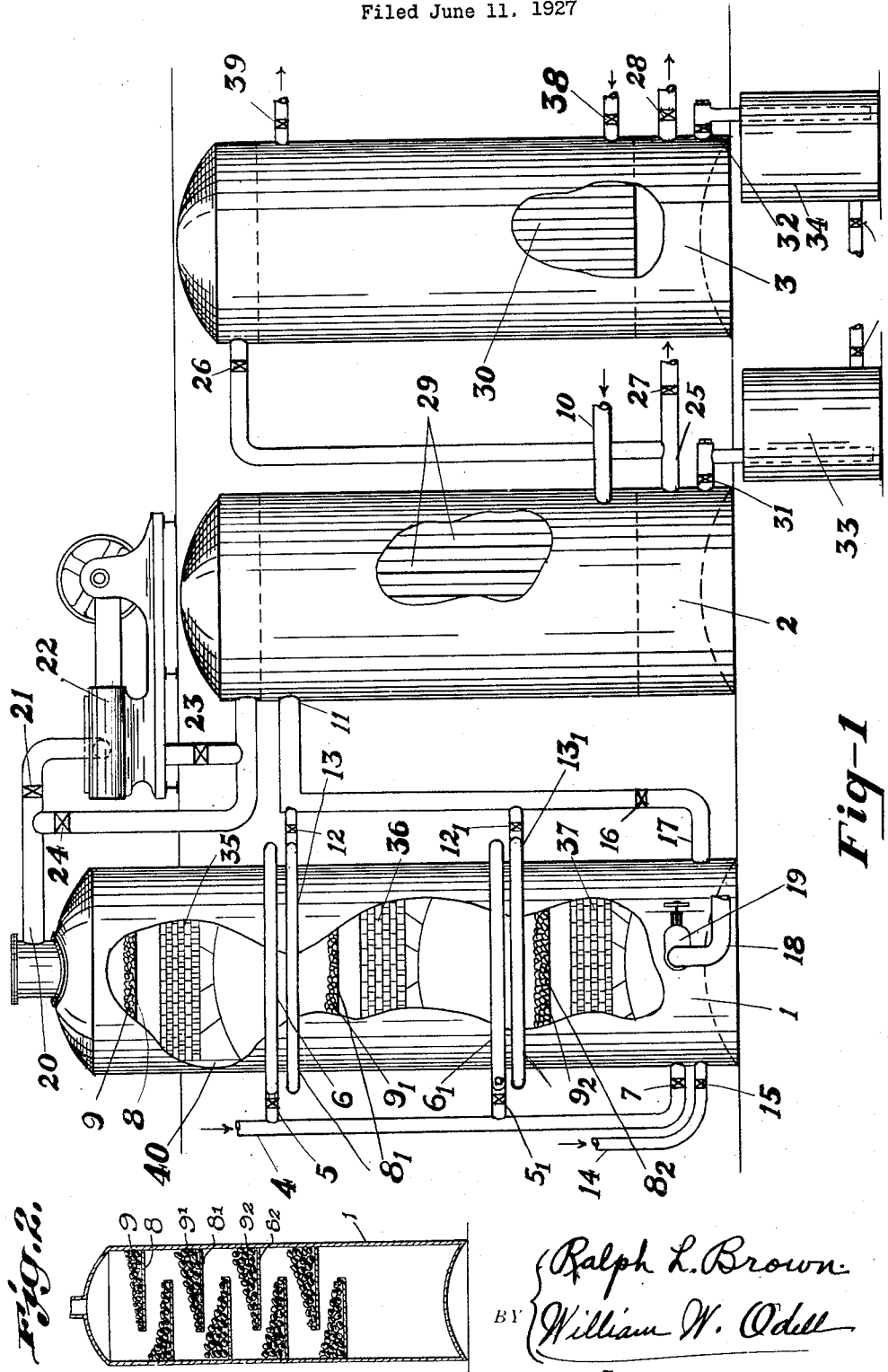
Ralph L. Brown
William W. Odell
INVENTORS.

Patented Aug. 23, 1932

1,873,536

UNITED STATES PATENT OFFICE

RALPH L. BROWN, OF PITTSBURGH, PENNSYLVANIA, AND WILLIAM W. ODELL, OF MINNEAPOLIS, MINNESOTA

PROCESS FOR PRODUCING REACTION PRODUCTS FROM HYDROCARBONS AND WATER

Application filed June 11, 1927. Serial No. 198,202.

This invention relates to, the process of producing reaction products from hydrocarbons and water, by bringing them together under controlled conditions with respect to temperature and pressure, in a suitable reaction chamber, causing chemical reaction to take place and increasing the speed of reaction, which is normally extremely slow, by catalytic means.

The objects of this invention are:

1—To prepare alcohols and ethers from hydrocarbons of the olefin series.

2—To prepare from unsaturated hydrocarbons by chemical reaction with water, oxidized and partly oxidized products.

3—To effectively utilize certain byproduct gases which are rich in unsaturates and which are wastefully used at present.

4—To prepare hydrocarbon-water reaction products by a continuous process.

5—To cause reaction to take place between hydrocarbons and water without the aid of an acid.

6—To produce, in a single continuous process, either an alcohol, an ether, both an alcohol and an ether or other hydration product by merely altering the temperatures, pressures and relative concentrations of the reacting substances—water and unsaturated hydrocarbons.

Some equations which are representative of the results obtainable with our process and which will be referred to hereinafter are as follows:

1. $C_2H_4 + H_2O = C_2H_5OH$
2. $2C_2H_4 + H_2O = C_2H_5OC_2H_5$
3. $C_3H_6 + H_2O = C_3H_7OH$
4. $2C_3H_6 + H_2O = C_3H_7OC_3H_7$
5. $C_2H_4 + C_3H_6 + H_2O = C_2H_5OC_3H_7$
6. $C_nH_{2n} + H_2O = C_nH_{2n+1}OH$
7. $2C_nH_{2n} + H_2O = C_nH_{2n+1}OC_nH_{2n+1}$

These equations are only representative of class reactions; other members of the series or unsaturated hydrocarbons of other than the olefin series combine with water in like manner by similar equations.

The production of ethyl alcohol ($C_2H_5OH$) from ethylene ($C_2H_4$) is not new but attention is called to the fact that the processes thus far proposed for making the former from the latter are not continuous nor can they be made continuous, so far as we are aware of. It will be noted that in processes suggested for thus preparing alcohol, an acid such as sulphuric acid ($H_2SO_4$) is employed, the reason being that the alcohol is produced by a double reaction in which the acid enters chemically as in the following equations.

(a) $C_2H_4 + H_2SO_4 = C_2H_5HSO_4$
(b) $C_2H_5HSO_4 + H_2O = C_2H_5OH + H_2SO_4$

Because the acid enters the reaction and because of the duplex nature of the reaction it is understood why this method of producing alcohol is carried out as a batch process. The corrosive nature of the liquids which must be pumped and handled in processes using acids necessitates the use of special and expensive equipment. The process being carried on at high pressures with acid is rather hazardous.

We have found that when water and ethylene are brought together under high pressure and at definite temperatures a direct combination takes place as shown in Equations 1 and 2, when a catalytic agent is used; the reaction products being alcohol or ether according to the relative concentration of the reacting substances. The conditions under which these and similar reactions such as shown in Equations 3, 4, 5, 6, and 7 take place are quite definite. We make use of the catalytic power of the contact surfaces of certain solids to effect chemical combination directly between hydrocarbons and water. The catalyzer does not enter into chemical reaction in our process, or in any process, but merely increases tremendously the velocity of reaction above that which obtains without a catalyst. The reactions without a catalyst, and by this general process, take place at so low a rate as to be impractical of commercial application.

A review of the literature on this subject leads us to believe that the chemical combination of water and one or more olefines to form alcohols, ethers or other hydration products has never been accomplished without a third chemical agent which latter enters into the chemical reactions; in fact in light of present day chemical experience and theories, it is impossible to thus prepare these products without said third chemical agent. This fact is one of the fundamentals upon which this application is made for patent and upon which our studies have been based. We do not require a third chemical agent to make these reactions possible by catalytic means when proper conditions obtain and we believe that the discovery of this process and the optimum conditions under which the reactions take place were made by us.

We have found experimentally that there are a number of catalytically active metal oxides which are satisfactory for increasing the velocity (reaction rate) in producing reaction products from water and unsaturated hydrocarbons. The oxides of aluminum, thorium, titanium, tungsten and chromium showed catalytic activity in this process. We do not limit ourselves to the use of these catalysts, for we believe that other catalysts will also function in like manner. Metal oxides containing small amounts of the oxides of cobalt, tungsten, thorium and the like are active catalysts. A combination of a plurality of metal-oxygen compounds is sometimes more satisfactory than a single oxide.

Briefly, the reactions are brought about by passing $H_2O$ and the hydrocarbon (or hydrocarbons) selected for the purpose, under pressure, continuously through a reaction chamber where said water and hydrocarbons while at an elevated temperature of about 100 degrees centigrade to 500 degrees centigrade are caused to contact a catalyst enroute through said chamber. It is preferable to pass the reacting substances through said chamber continuously but obviously the same result can be obtained in intermittent or cycle operation. Ethers are more readily prepared by this process when the concentration ratio of the reacting substances—hydrocarbon to water—expressed in mols per unit volume is greater than 1 to 1. The percentage of ethers in the reaction products increases as said concentration ratio increases above 1 to 1. The ratio "called for" to satisfy the chemical equations is 2 to 1 but we find that maximum yield is obtained when an excess of hydrocarbon is used. The conditions which are most favorable for the production of alcohols is the reverse of this; namely, for high yields of an alcohol containing only small amounts or traces of an ether the concentration ratio of the reacting substances should not be appreciably greater than 1 to 1 (molecular proportions) and preferably should be less than 1 to 1; expressed differently, an excess of $H_2O$ in the reacting mixture favors the production of alcohols; an excess of hydrocarbons favors the production of ethers.

Suitable temperatures for operating with our process are substantially within the limits 100° C. to 600° C. The exact optimum temperature varies with the catalyst and with the condition or activity of it, and also with the particular hydrocarbons being treated. The higher members of the series, that is, hydrocarbons of high molecular weight react most favorably at lower temperatures than those of relatively low molecular weight, other factors remaining the same. Optimum temperatures also are functions of the pressures used, or, vice versa, the optimum pressures are functions of temperatures. For example, for the production of alcohol of low ether content from ethylene ($C_2H_4$) the ethylene pressure is advantageously kept at about 10 atmospheres when the temperature of the reacting mediums ($C_2H_4$ and $H_2O$) is about 175° C.; at about 25 atmospheres near 225° C. and at about 60 atmospheres pressure at temperatures near 275° C. Somewhat lower temperatures than these can be used for making hydration products using unsaturated hydrocarbons of higher molecular weight than ethylene.

Our process is distinct from others, so far as we are aware of, in that it permits of a continuous operation of the reactions yielding alcohols or ethers in a reaction chamber without the use of acids. It will be noted that the concentration of the acids which are used in other processes and which are ever being diluted during operation, is not a branch operation in the production of alcohols and ethers by our process.

We find that it is possible to pass a gas containing unsaturated hydrocarbons such as $C_2H_4$ along with steam, heated and under pressure, over a catalyst—active contact surface—and produce an alcohol which can be removed by condensing and scrubbing or by absorption by an absorbent such as activated carbon, silica jel or the like. Applied to commercial combustible gases containing ethylene or other unsaturated hydrocarbon gas it is possible to utilize said hydrocarbons to better advantage than by burning them as fuel, by their conversion into alcohols or ethers.

In general the rate of conversion of the hydrocarbons into alcohols and ethers is higher with high pressure than with low pressure but in order to operate in the gaseous phase it is necessary to adjust temperatures as the pressure is adjusted. This means that for a given pressure there is a minimum temperature below which operation is not economical; this temperature is substantially the temperature at which the vapor pressure of the reacting substances equals the pressure in the system. Expressed differently we prefer to operate with the reacting substances in the vapor phase but the temperature-pressure conditions may be such that the vapors are not in the form of dry gases. Obviously then, when the concentrations of the reacting substances are changed, as when changing the operation from alcohol to ether production, the optimum conditions of temperature and pressure are altered. This is one reason why the optimum pressures, using hydrocarbons of higher molecular weight than $C_2H_4$ are lower, their vapor pressures at a given temperature are lower; to keep them in the gaseous phase it is necessary to either increase the temperature or decrease the pressure. With members high in the olefin series it is preferable to work at moderately low pressures.

For the production of ether ($C_2H_5OC_2H_5$) from $C_2H_4$ and $H_2O$, alumina ($Al_2O_3$) is a good catalyst and a satisfactory working temperature is as low as 250° C. using an excess of $C_2H_4$ above that required for alcohol production and preferably using an excess of the amount required to satisfy equation Number 2. When making alcohol ($C_2H_5OH$) from $C_2H_4$ and $H_2O$ 360° C. is a better working temperature and the $H_2O$ should preferably be in excess of the amount required to balance equation Number 1. Using $TiO_2$ as a catalyst a satisfactory working temperature is about 350° C. Thoria ($ThO_2$) is a good catalyst and good results are obtained with it at 280° C. to 350° C.; 325° C. being a good average temperature at which operations are satisfactory with thoria. Blue oxide of tungsten functions between 250° C. and 400° C.; 350° C. being a good average working temperature.

Another advantage of our process over those employing acid is that in the latter processes certain olefins which are subject to polymerization are polymerized by contact with the acid and losses occur in efficiency and in alcohol yield. These losses are not experienced in our process.

Although olefins have been referred to as an example in the foregoing it is understood that many unsaturated hydrocarbons behave in a similar manner, hence we prefer not to limit ourselves to the use of olefins. For example, the drip oils from city-gas mains contain unsaturates and in particular, appreciably large amounts of styrene which can be converted by this means—treatment with steam under pressure in the presence of a catalyst—into methyl-phenyl-carbinol and phenyl-ethyl alcohol. The losses in processing by the latter means are very much less than by any other process known to us.

An apparatus for economically carrying out our process is shown in Figure 1 in front elevation, a portion of the different chambers being cut away for the purpose of showing the interior in section. Figure 2 is a diagrammatic vertical section of a reaction chamber showing one method of arranging the grids or catalyst trays.

In Figure 1, the reaction chamber is shown at 1, a heat-economizer at 2 and a cooler or condenser at 3. Steam or water vapor is supplied to 1 through steam line 4, valves 5, 5$_1$ and 7 and bustle pipes 6 and 6$_1$ which latter have regularly spaced inlet connections to chamber 1 which are not detailed. 14 is also a steam line with valve 15, for introducing superheated steam. Hydrocarbon vapors are introduced to 1 through inlet 18 and valve 19 and also through valves 12, 12$_1$ and 16 and inlet 17. The bustle pipes for hydrocarbon gas being at 13 and 13$_1$. These bustle pipes have regularly spaced inlet connections to reaction chamber which are not detailed. Catalytic material is shown at 9, 9$_1$ and 9$_2$ supported upon grids 8, 8$_1$ and 8$_2$; the number of grids not being limited to 3. Hydrocarbon gas enters heat-exchanger at 10, passing out at 11. Products of reaction pass out from reaction chamber 1 through 20, 21 into expansion engine 22, out through exhaust 23 into chamber 2, down through this chamber, out through 25 through valve 26 into chamber 3, down through this chamber and out at 28. Chambers 2 and 3 are substantially tubular condensers, water or other cooling fluid being used in the latter chamber and hydrocarbon gas is used as cooling medium in chamber 2. Cooling fluid enters 3 through 38 and is discharged through 39. The expansion engine may be cut out of the system by closing valves 21 and 23 and opening valve 24. Drains for liquids condensing in chambers 2 and 3 are shown with control valves respectively at 31 and 32 and with receivers 33 and 34. Insulation of chamber 1 is shown at 40. Checkers in arranged formation are shown at 35, 36 and 37.

Means for heating water to produce steam under pressure are not shown and are not part of this invention. Likewise means are not shown for heating hydrocarbons and generating vapors for this is not new; the inlet for high-temperature hydrocarbon gas into chamber 1 is shown at 18. It will be noted that a means for a certain amount of preheating of the hydrocarbon gas is afforded by heat-exchanger 2. This gas upon entering through 17 can be further heated in chamber 1 by the steam when the latter is heated above the temperature of the former.

To operate by our process proceed as follows: Introduce steam into reaction chamber 1 through valve 7 removing it through expansion engine 22 and chamber 2, and outlet 27, valve 27 being at least partly open and valve 26 closed. After the catalytic material and chamber 1 are heated to a working temperature, say 225° C., hydrocarbon gas is allowed to enter chamber 2 through 10, to be preheated therein and enter 1 through valve 16. At 225° C. a pressure, approximately 25 atmospheres, is maintained in the reaction chamber. The reaction products and any excess of $H_2O$ or hydrocarbons are passed into expansion engine 22, out through exhaust and valve 23 into heat exchanger 2. Valve 27 is closed and valves 26 and 28 are at least partly open and the gases from 2 are conducted through 25 and 26 into chamber 3 and out through 28. Cooling fluid is introduced into 3 through 38 in sufficient amounts to cool and condense the condensable products in this chamber and is removed through 39; the condensate in 2 and 3 are removed through 31 and 32.

In Figure 2 the same system of numbering is employed. The grids or trays for supporting the catalytic material are shown arranged in baffle formation. Any suitable means for supporting the catalyst may be used which will afford a means for the reacting substances to contact said catalyst.

It has been shown that definite temperature conditions should be maintained in the reaction chamber, and since the reactions are exothermic it is necessary to make regulations for this purpose. The mixture of $H_2O$ and hydrocarbon contacting the lower layer of catalyst should be at approximately 225° C. in the example cited. If below this temperature it can be raised thereto by either of three ways: namely, alluding to Figure 1 again, increase the temperature of the steam before introduction into reaction chamber 1 (a boiler with steam superheater for generating and superheating steam is assumed but not shown in Figure 1), or products passing out through 20 can be introduced into chamber 2 at a higher temperature by reducing the amount entering expansion engine 22, by opening valve 24 to a controlled amount, thus increasing the temperature of the hydrocarbon gas heated in chamber 2; or suitably heated hydrocarbon gas can be introduced through valve 19. In order to keep the temperature in the upper layers of catalytic material from rising too high, means are provided for introducing steam, hydrocarbon gas or both at different levels, between consecutive layers of catalyzer. It will be observed that the temperature of the hydrocarbon gas coming from chamber 2 will not be as high as that of the reaction products leaving reaction chamber 1, therefore admitting this gas through bustle pipes 13 and $13_1$ and utilizing the heat of reaction to raise its temperature to the desired 225° C. only a small amount of hydrocarbon gas need be heated to the working temperature and introduced through 19.

After the operation is thoroughly under way and when the steam is sufficiently hot valve 19 can be closed and the hydrocarbon gas leaving 2 through 11 can be used alone, valves 12, $12_1$ and 16 being open. The relative amounts of steam and hydrocarbon are controlled to give the desired end products (the desired amount of hydration).

The temperature of the different layers of catalyst is watched by means of pyrometers the thermocouples of which are located in chamber 1 at different levels; these are not shown in the drawing for simplicity. If the temperature rises too high in the upper layers more steam is admitted through the bustle pipes 6 and $6_1$; hydrocarbon gas can be similarly and simultaneously admitted up to the point where an excessive amount of ether is formed; it will be remembered that excess of steam is favorable for the formation of an alcohol and excess hydrocarbon is favorable for ether formation. By testing the composition of the products made and by watching the temperatures recorded by pyrometers a delicate adjustment of the steam and hydrocarbon-gas valves can be made. When the temperatures in the upper layers of catalyst falls too low the amount of steam and hydrocarbon gas admitted through bustle pipes in upper zones is decreased. It is sometimes desirable under these conditions to admit superheated steam through 14 and 15.

The amount of reaction products condensing in chambers 2 and 3 will depend upon the temperatures and pressures prevailing therein and upon the vapor pressures of the particular alcohols or ethers made. By regulation of cooling and condensing, a certain amount of separation of mixed products can be obtained. The relative size of chamber 2 accordingly may vary with respect to the reaction chamber for different reactions. The products with the higher vapor pressures condense in the last and coolest chamber in the series provided the pressures are not materially different in the different condensing chambers and provided the temperatures are sufficiently low.

Gases and vapor under pressure absorb heat upon a release of the pressure and in our process we find it is sometimes advantageous for better heat transfer purposes or for particular fractional condensation results to decrease the pressure in stages. If we allow the hot gas under pressure as it leaves the reaction chamber at 20 to completely expand to atmospheric pressure before entering chamber 2 the heat transfer efficiency in the latter chamber may be lower than otherwise. Therefore there is an economic limit to the use of the expansion engine 22. For maximum amount of preheating of hydrocarbon gas in chamber 2 the pressure of the gases leaving 1 through 20 should not be appreciably reduced; accordingly we have provided means for maintaining the pressure in chamber 2. By closing valves 21 and 23, opening 24 wide open and expanding the gas through valve 26 the hydrocarbon gas leaving 2 through 11 is heated to a higher temperature and the cooled gases leaving 2 through 25 upon expanding in 3 allow a low temperature to obtain therein under some conditions. It is preferable, for obvious reasons, to cool the reaction products before expansion in order to get the maxium amount of condensation, otherwise some condensable matter will remain in the gaseous byproducts. When highly volatile products such as ethyl ether are made it is preferable to completely cool the reaction products before releasing the pressure and in such cases the expansion takes place beyond chamber 3, namely at valve 28. The refrigeration effect of this expansion can be utilized but this is not shown because this step by itself is not new. It will be noted that it is possible to fractionally condense a mixture of products by maintaining the pressure and using a multiplicity of condensers or heat-exchangers. In this instance the product with the highest boiling point condenses in the first condenser and that one with the lowest boiling point condenses in the last and coolest of a series of condensers.

In the reaction chamber shown in Figure 1 the raw materials introduced are caused to pass upwardly but obviously the reactions could take place if the raw materials were introduced at the top and contacted the catalyst during a downward course.

The trays for supporting catalyst may be perforated plates or grids covering an entire sectional area each or they may be plates or grids and cover only a portion of a sectional area, that is, they may be arranged in baffle formation as shown in Figure 2. These grids are removable.

The $H_2O$ and hydrocarbons can be mixed before entering the reaction chamber if desired. The checkerwork shown at 35, 36 and 37 functions as heat equalizing means when the temperatures of the $H_2O$ and hydrocarbons are not alike as introduced into the reaction chamber and as an aid in the mixing of the latter. Manholes or openings are provided for removing and replacing old catalyst.

We believe that in conjunction with the present oil-refining processes and in connection with shale-oil refining processes our process will find extended application.

We are aware of the fact that unsaturated hydrocarbons having 3 carbon to carbon bonds in the unsaturated linkages, of which acetylene is an example, can not safely be compressed and heated since they frequently explode when thus treated, depositing carbon. Acetylene explodes under some conditions at 5 atmospheres pressure without any admixture of air. We do not include triple bond unsaturates in our claims, not only because they can not be compressed with safety, but also because they do not combine directly forming ethers and alcohols but rather, at low pressures are said to react, forming aldehydes, acids and gaseous products.

We claim:

1. The process for the production of an hydration product of an olefin which comprises heating an olefin and water to a temperature above 100° C. but below 600° C. and, while under pressure greater than atmospheric, causing them to contact the surface of a solid hydration catalyst and to combine chemically and directly at a high velocity by virtue of said catalyst; said water and said olefin being mixed in proportions whereby both the alcohol and the ether corresponding to said olefin are formed.

2. The process for the production of an hydration product of an olefin from an olefin and water, which comprises heating said olefin and water while under pressure greater than atmospheric to a temperature greater than 100° C. but below 600° C. and while under said pressure causing them to contact the surface of a catalyst and to combine chemically and directly at a high velocity by virtue of said catalyst; said temperature being substantially the minimum at which said olefin and water will remain in the vapor phase under said pressure.

3. The process for the production of an hydration product of an olefin from an olefin and steam, which comprises heating said olefin and steam to a temperture above 100° C. but below 600° C. while under pressure greater than 10 atmospheres, and while under said pressure in the vapor phase and mixed substantially in molecular combining-proportions, causing them to contact the surface of a solid catalyst and to combine chemically and directly at a high velocity by virtue of said catalyst.

4. The process for the production of an hydration product of an unsaturated hydrocarbon compound having less than 3 carbon-to-carbon bonds in the unsaturated linkage, from said hydrocarbon compound and steam, which comprises heating said hydrocarbon compound and steam to a temperature above 100° C. but below 600° C., causing them to contact the surface of a solid catalyst while thus heated and while under pressure greater than atmospheric and to combine chemically and directly by virtue of said catalyst, forming both the alcohol and the ether corresponding to said unsaturated hydrocarbon; said steam and hydrocarbon compound being mixed in proportions whereby both the said alcohol and ether are formed.

5. The process for the production of an hydration product of an unsaturated hydrocarbon compound having less than 3 carbon to carbon bonds in the unsaturated linkage, from said hydrocarbon compound and steam, which comprises heating said unsaturated hydrocarbon compound and water to temperatures above their normal boiling points but below 600° C., mixing the vapors resulting from said heating in predetermined proportions which are substantially molecular combining-proportions, and causing them to contact the surface of a catalyst and to combine chemically and directly at a high velocity by virtue of said catalyst.

6. The process for the production of an hydration product of an unsaturated hydrocarbon compound having less than 3 carbon to carbon bonds in the unsaturated linkage, from said hydrocarbon compound and water, which comprises heating said unsaturated hydrocarbon compound and water to temperatures above their normal boiling points but below 600° C., mixing the vapors resulting from said heating, under pressure greater than 10 atmospheres, in predetermined proportions which are substantially molecular combining-proportions, and causing them, while under pressure greater than atmospheric, to contact the surface of a catalyst and to combine chemically and directly at a high velocity by virtue of said catalyst.

7. The process for the production of hydration products from olefins and water, comprising, contacting a gaseous mixture of water and said olefins including essentially ethylene with a solid catalyst capable of promoting the hydrolysis of said olefins to the corresponding alcohols and ethers, at a temperature above 100° C. but below 600° C.

8. The process for the production of an hydration product of an unsaturated hydrocarbon compound comprising ethylene from said hydrocarbon compound and water, which comprises heating said hydrocarbon compound and water to a temperature above 100° C. but below 600° C. under pressure greater than atmospheric but less than that at which appreciable condensation takes place, and causing them to pass simultaneously and substantially in a continuous stream contacting a mass of solid catalytic material and to combine chemically and directly at a high velocity by virtue of the catalytic action of said catalytic material forming a hydration product of said hydrocarbon compound, subsequently cooling and condensing the resulting products of reaction.

9. The process for the production of hydration products of an unsaturated hydrocarbon from an unsaturated hydrocarbon having less than 3 carbon-to-carbon bonds in the unsaturated linkages, and steam, comprising, causing a mixture of said steam and said unsaturated hydrocarbon heated to 250° to 360° C. and under a pressure of 10 to 60 atmospheres to pass in continuous stream contacting solid catalytic material and to react chemically and directly by virtue of said catalytic material forming a plurality of hydration products comprising both an alcohol and an ether corresponding to said unsaturated hydrocarbon compound and subsequently removing said hydration products from said stream, the amounts of said steam and hydrocarbon in said mixture being proportioned to favor the simultaneous formation of both said alcohol and said ether.

10. In the process described in claim 9 the step consisting in introducing additional steam into said fluid stream during a late stage of the reaction period.

11. The process for the production of hydration products from unsaturated hydrocarbon compounds, comprising contacting a gas mixture which comprises an unsaturated hydrocarbon compound having an olefin linkage and steam with a solid catalyst capable of promoting the hydration of said hydrocarbon at a temperature above 100° C. the mixture of said steam and hyrocarbon being substantially in molecular combining proportions.

12. The process for the production of hydration products from unsaturated hydrocarbon compounds, comprising, contacting a gas mixture which comprises unsaturated hydrocarbon compounds having an olefin linkage including a substantial amount of ethylene and steam with a solid catalyst capable of promoting the hydration of said hydrocarbons at a temperature above 100° C. and at a pressure greater than atmospheric.

13. The process for the production of hydration products from unsaturated hydrocarbon compounds, comprising contacting a gas mixture comprising steam and an unsaturated hydrocarbon compound having an olefin linkage, corresponding to the hydration product to be made, with a solid catalyst capable of promoting the hydration of said hydrocarbon compound to said hydration product at a temperature above 100° C. and at a pressure greater than atmospheric; said steam and hydrocarbon being mixed in substantially molecular combining proportions.

14. The process for the production of hydration products from unsaturated hydrocarbon compounds, comprising contacting a gaseous mixture comprising steam and an unsaturated hydrocarbon compound having an olefin linkage, corresponding to the hydration product to be made, with a solid catalyst capable of promoting the hydration of said hydrocarbon to said hydration product at a pressure greater than atmospheric and at a temperature above 100° C.; said temperature being substantially the minimum at which said gaseous mixture will remain in the vapor phase under said pressure.

15. In the process of making hydration products from an olefinic hydrocarbon by passing a gaseous stream comprising water vapor and said hydrocarbon in contact with a solid catalyst adapted to catalyze the hydration of said hydrocarbon, the step, introducing an additional amount of one of the reactants into said stream during a late stage of the reaction period.

RALPH L. BROWN.
WILLIAM W. ODELL.